United States Patent [19]

Nomiyama

[11] 3,997,208
[45] Dec. 14, 1976

[54] ANGULAR IMPACT ABSORBING DEVICE

[76] Inventor: Tetsuo Nomiyama, 1526 N. Century, Santa Ana, Calif. 92703

[22] Filed: Dec. 1, 1975

[21] Appl. No.: 636,721

[52] U.S. Cl. .............................................. 293/71 R
[51] Int. Cl.² ........................................ B60R 19/08
[58] Field of Search ............ 293/19, 25, 26, 64–67, 293/71 R, 71 P, 99, 84, 85, 89, 97, 98, 72

[56] References Cited
UNITED STATES PATENTS

| 1,467,640 | 9/1923 | Ilich | 293/72 |
| 2,519,429 | 8/1950 | Brandvold | 293/89 |
| 2,600,060 | 6/1952 | Lopes et al. | 293/85 |
| 2,603,517 | 7/1952 | Zitarosa | 293/89 |
| 2,896,735 | 7/1959 | Bohn | 293/89 X |

Primary Examiner—Stanley H. Tollberg
Assistant Examiner—Norman L. Stack, Jr.

[57] ABSTRACT

An angular impact-absorbing device applicable to auto bumpers and various types of guard rails, wherein the device comprises a first fixed body member secured to a substantially stationary support, a second movable body member slidably mounted to the first fixed body member, and bearing elements disposed between each body member, whereby angular impact received by the movable body member will cause the movable body to slide relative to the first fixed body and thereby absorb a substantial portion of the impact forces.

6 Claims, 7 Drawing Figures

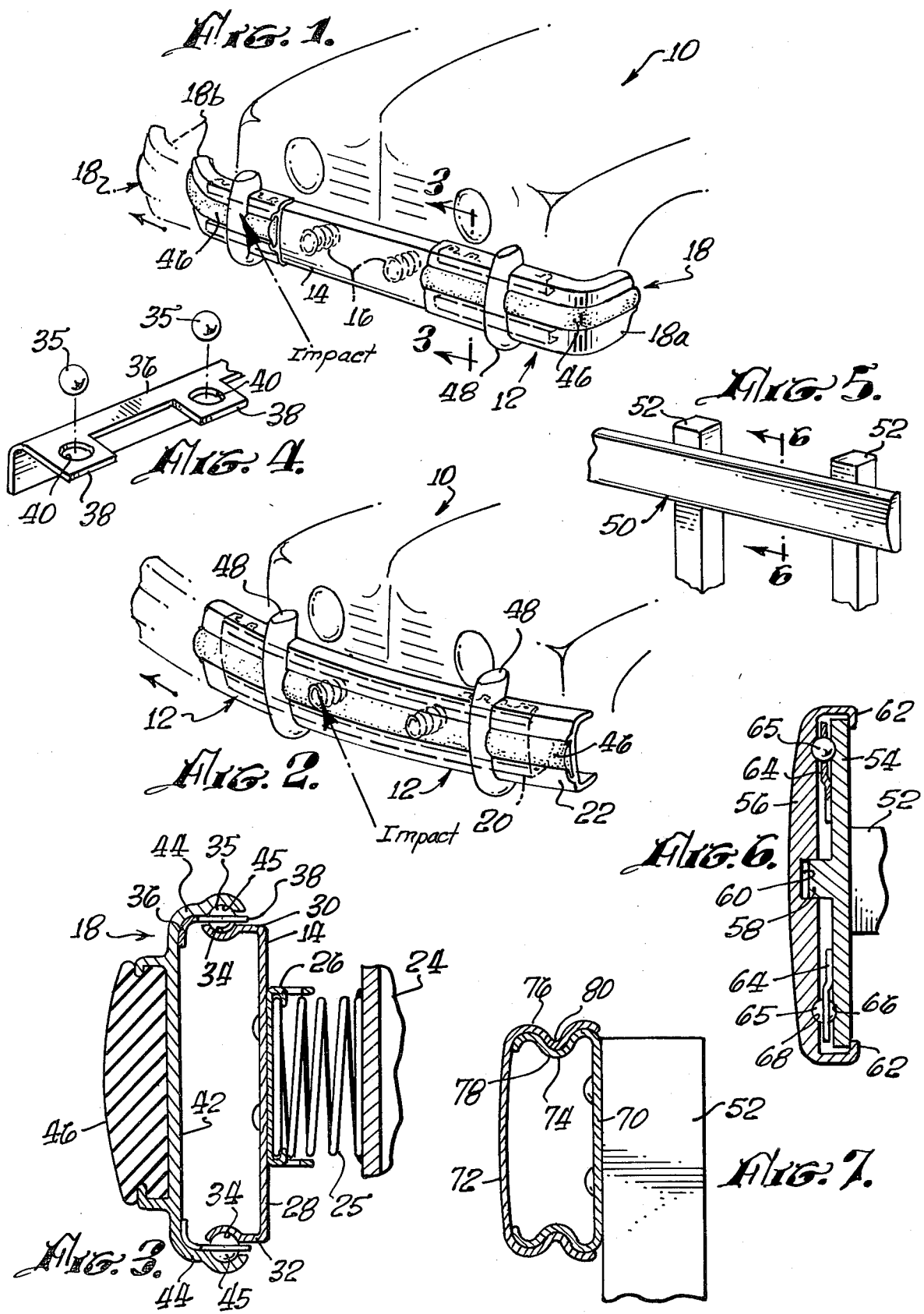

ANGULAR IMPACT ABSORBING DEVICE

BACKGROUND OF THE INVENTION

1. Field of the Invention

This invention relates generally to impact-absorbing devices and, more particularly, to angular impact-absorbing devices that are applicable for use as vehicle bumpers, as well as various types of guard rails.

2. Description of the Prior Art

Various problems and difficulties are encountered in providing suitable means for reducing and/or alleviating serious injuries, or preventing fatalities, to passengers when the vehicles in which they are riding become involved in an accident.

Several methods that are being developed and some that are being used, such as seat belts and protective balloons, do not provide a means by which the vehicle itself absorbs the engaging impact of a collision.

At present, there is a need for a device, for absorbing angular impact, that is capable of being designed for either vehicles and/or guard rails that are generally found along streets and highways.

SUMMARY OF THE INVENTION

The present invention comprises an angular impact-absorbing device having two body members, the first body member being substantially fixed to a stationary member, while the second body member is formed to be movably attached to the first member. That is, the movable body will slide longitudinally with respect to the fixed body.

Accordingly, the fixed body member is secured to a substantially stationary structure. If, for example, the impact-absorbing device is designed as a bumper for attachment to a vehicle, the fixed member is mounted directly to the body structure of the vehicle, as is generally done when auto bumpers are installed. Thus, the first body is an elongated member extending across the width of the vehicle in the normal bumper fashion. Movably disposed and supported by the first body member is the second body member, wherein each member is provided with bearing surfaces that engage the other, or are adapted to accommodate ball bearings therebetween.

However, the impact-absorbing concept as described also allows the device to be designed as rail guards of the type generally located along the various roadways and highways.

It is also contemplated that such a device can be used to completely encircle a vehicle.

OBJECTS AND ADVANTAGES OF THE INVENTION

The present invention has for an important object a provision wherein a bumper of a vehicle or a guard rail along a highway can be designed as an impact-absorbing device.

It is another object of the invention to provide an angular impact-absorbing device wherein the bumpers of a vehicle will include a slidable member which will move relative to a stationary member, thereby allowing the major portion of the engaging forces to be diverted.

It is still another object of the present invention to provide an angular impact-absorbing device that is readily adaptable in structures other than vehicles.

It is a further object of the invention to provide an angular impact-absorbing device comprising a movable member, a stationary member, and bearing means spaced therebetween.

Still another object of the invention is to provide a device of this character that is relatively inexpensive to manufacture.

It is still another object of the present invention to provide a device of this character that is simple and rugged in construction.

And still another object of the invention is to provide an angular impact-absorbing device that, in addition to its safety factor, provides a means of reducing collision damage to the vehicle.

The characteristics and advantages of the invention are further sufficiently referred to in connection with the accompanying drawings, which represent one embodiment. After considering this example, skilled persons will understand that variations may be made without departing from the principles disclosed and I contemplate the employment of any structures, arrangements or modes of operation that are properly within the scope of the appended claims.

DESCRIPTION OF THE DRAWINGS

Referring more particularly to the accompanying drawings, which are for illustrative purposes only:

FIG. 1 is a perspective view of one embodiment of the present invention illustrated as a bumper mounted to a vehicle;

FIG. 2 is also a perspective view of a second embodiment of the device, wherein the slidable member is formed as a single section;

FIG. 3 is an enlarged cross-sectional view taken substantially along line 3—3 of FIG. 1;

FIG. 4 is a perspective view of the ball bearings and the support bracket therefor;

FIG. 5 is a perspective view of another embodiment of the invention illustrated as being formed as a guard rail;

FIG. 6 is a cross-sectional view taken along line 6—6 of FIG. 5; and

FIG. 7 is a cross-sectional view similar to FIG. 6 wherein the guard rail is provided with a different mounting configuration.

DESCRIPTION OF THE PREFERRED EMBODIMENT

Referring more particularly to FIGS. 1 and 2, there is shown a portion of a vehicle, generally indicated at 10, wherein one form of an angular impact-absorbing device is illustrated as being a front vehicle bumper, designated generally at 12. It should be understood that the impact-absorbing bumper is also adapted to be mounted to the rear of the vehicle, even though it is not shown.

However, in FIG. 1 the angular impact-absorbing device is shown as comprising a single, substantially-stationary, body member 14 affixed to vehicle 10. Said stationary body member 14 can be mounted to said vehicle in any well-known, suitable manner; but, as an additional means to absorb direct engaging forces, there are provided mounting shock springs 16. In this particular arrangement, stationary body member 14 extends longitudinally to each side of the vehicle, thus protecting the entire width thereof.

Mounted to each free terminating end of the stationary body member is a pair of slidable body members 18 adapted to be moved longitudinally relative to said first stationary body member. The second slidable body members are indicated at 18a and 18b.

In order to accomplish the proper movement upon impact, there is provided a bearing means disposed between each body member 14 and 18. Various types of bearing means and surfaces are contemplated and will be fully described hereinafter.

Referring now to FIG. 2 in particular, there is also shown a substantially stationary body member 20 which is constructed similar to that shown in FIG. 1. However, the secondary slidable member is illustrated as being of a single longitudinal configuration, indicated at 22.

To provide a clearer understanding of the capabilities of the above devices, there is shown in FIG. 3 a cross-sectional view taken substantially along line 3—3 of FIG. 1. However, it should be understood that the cross-section of the embodiment as shown in FIG. 2 would be identical; hence, FIG. 3 will suffice for both Figures.

In FIG. 3 the fixed body member 14 is mounted to the vehicle frame 24 by means of coil spring 25 secured by welding 26, or other suitable fastening means, to frame 24. A mounting bracket 26 is affixed to body member 14 and is adapted to fixedly receive the other end of the coil spring 25. Thus all forward or direct engaging forces will be reduced by such spring mountings. The stationary body member 14 is formed as a longitudinal channel having a rigid mounting wall 28 with inwardly bent flanges 30 and 32 formed on the entire upper and lower longitudinal edges thereof. Formed within each flange 30 and 32 is a racer groove 34. These grooves are part of the bearing means disposed between each body member, wherein the bearing means as shown in FIG. 3 includes a plurality of ball bearings 35 which are held in spaced relation to each other by means of a spacer plate 36 (See FIG. 4).

The spacer plate 36 comprises a substantially "L"-shaped plate having spaced fingers 38 in each of which is disposed an aperture 40 adapted to receive a ball bearing 35.

The plate 36 is secured to the inner surface of the slidable body member which also includes a main wall 42 having longitudinal flanges 44 formed thereon, wherein the flanges are provided with bearing raceways 45.

Hence, it can be seen that an angular impact of an object will move the second body member along the first body member, thereby allowing the shock to be absorbed in its movement thereof.

It should be further understood that the ball bearings are held in a relatively tight position between fingers 38 and raceways 45 so that the sliding movement must be generated under force.

Various protective pads, such as 46, can be adapted for mounting to the second body member as shown. Also, the well known bumper guards 48 can be installed in the normal manner, if so desired.

Referring now to the application of the angular impact-absorbing device as a guard rail or the like. As previously mentioned, there is a need for safety railing along highways and freeways, wherein the railings are capable of absorbing angular engaging forces from out-of-control vehicles.

Accordingly, there is shown in FIGS. 5, 6, and 7 various methods and configurations of railings adapted to provide a greater safety factor than heretofore known. FIG. 5 illustrates a shock-absorbing railing, generally indicated at 50, mounted to fixed post supports 52. Fixedly secured to the post supports 52 is a substantially-stationary body member 54 having a secondary, movable body member 56. Said movable body member is adapted to slide longitudinally with respect to the first fixed body member and is supported thereon by a centrally disposed rib member 58 formed as an integral part of the fixed body member 54, which is adapted to be received in a matching longitudinal groove 60 formed in the inner face of the movable body 56. In addition, there is provided a pair of support flanges 62 formed along each free edge of the slidable member 56, thereby preventing disengagement between each member 54 and 56.

Here, too, a bearing means is provided between each body member, wherein a bearing mounting plate 64 is affixed to the stationary member 54, said plate being similar to that previously described and having a plurality of apertures to receive ball bearings 65, as seen in FIG. 6. Thus, each body member 54 and 56 includes raceways 66 and 68, respectively, whereby bearings 65 are movably received therein in the well known manner.

Referring now to FIG. 7, there is shown an alternative arrangement of a railing. The railing comprises a first, substantially stationary body member 70 secured to a post support 52 and a movable, second body member 72. These bodies are interconnected by matching coupling flanges 74 and 76, respectively. That is, flange 74 is formed having a central longitudinal groove 78 in which a mating, longitudinal rib 80 is received therein, with each flange having a substantially "S"-shaped configuration. This configuration provides the bearing means that is required between each body member and also provides a coupling means whereby the movable body member 72 is attached to the stationary member 70. It is also contemplated that a wet or dry lubricant will be disposed between the engaging flanges 74 and 76.

Thus, it can be seen that, when a vehicle makes a forceful angular contact with the guardrail 50, the movable body 72 will slide in the direction of the impact, thereby absorbing a high percentage of the shock involved therein.

The invention and its attendant advantages will be understood from the foregoing description and it will be apparent that various changes may be made in the form, construction and arrangement of the parts of the invention without departing from the spirit and scope thereof or sacrificing its material advantages, the arrangement herein before described being merely by way of example, and I do not wish to be restricted to the specific form shown or uses mentioned, except as defined in the accompanying claims.

I claim:
1. An angular impact-absorbing device comprising:
   a first, elongated body member mounted in a fixed, substantially-stationary manner;
   a second, elongated body member slidably mounted to said first, fixed body member for longitudinal movement relative thereto;
   bearing means disposed between said first and second body members, and comprising:
   a plurality of ball bearings positioned between said first and second body members and held in spaced relation to each other;
   retaining means for positioning said ball bearings therebetween, said means secured to at least one of said body members; and wherein said first body member is formed by an elongated channel having projecting longitudinal flanges, said flanges being provided with said raceways; and wherein said second body member is formed as an elongated channel having projecting flanges provided with said raceways, said flanges of said second body member being superposed over said flanges of said first body member, whereby said raceways thereof are in alignment with each other to receive said ball bearings therein.

2. An angular impact-absorbing device comprising:

a first, elongated body member mounted in a fixed, substantially-stationary manner;

a second, elongated body member slidably mounted to said first, fixed body member for longitudinal movement relative thereto;

bearing means disposed between said first and second body members, and comprising:

a plurality of ball bearings positioned between said first and second body members and held in spaced relation to each other;

retaining means for positioning said ball bearings therebetween, said means secured to at least one of said body members;

wherein said retaining means comprises a retaining plate having a plurality of projecting fingers, said fingers being provided with an aperture to receive said ball bearings therein; and bearing means includes a pair of raceways formed in said first and second body members.

3. A device as recited in claim 2, wherein said first body member is secured to a vehicle whereby said angular impact device defines a vehicle bumper.

4. A device as recited in claim 2, wherein said device forms a guard rail and wherein there is included means for mounting said guard rail.

5. A device as recited in claim 4, wherein said stationary first body member includes a centrally disposed rib member form as an integral part thereof, and said movable second body member has a longitudinal groove to receive said rib member, whereby said second body member is supported on said first body member.

6. An angular impact-absorbing device comprising:

a first, elongated body member mounted in a fixed, substantially-stationary manner;

wherein said first stationary body member comprises:

an elongated channel member having inwardly turned flanges, each of said flanges having a longitudinal groove formed therein;

a second, elongated body member slidably mounted to said first fixed body member for longitudinal movement relative thereto, said second movable body comprises an elongated channel member having inwardly turned flanges, each of said flanges being provided with a central longitudinal rib member adapted to be received in said groove of said first body member; and bearing means disposed between said first and second body members, said bearing means comprises a lubricant disposed between said oppositely disposed flanges.

* * * * *